US012633863B2

(12) United States Patent
Murakami et al.

(10) Patent No.: US 12,633,863 B2
(45) Date of Patent: May 19, 2026

(54) MOTOR CONTROL DEVICE, MOTOR CONTROL SYSTEM, AND MOTOR CONTROL METHOD

(71) Applicant: Panasonic Intellectual Property Management Co., Ltd., Osaka (JP)

(72) Inventors: Kenta Murakami, Osaka (JP); Hiroshi Fujiwara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 276 days.

(21) Appl. No.: 18/560,383

(22) PCT Filed: Apr. 12, 2022

(86) PCT No.: PCT/JP2022/017632

§ 371 (c)(1),
(2) Date: Nov. 11, 2023

(87) PCT Pub. No.: WO2022/244553

PCT Pub. Date: Nov. 24, 2022

(65) Prior Publication Data

US 2024/0243686 A1    Jul. 18, 2024

(30) Foreign Application Priority Data

May 20, 2021    (JP) ................................. 2021-085105

(51) Int. Cl.
*H02P 29/20* (2016.01)
*H02P 29/10* (2016.01)

(52) U.S. Cl.
CPC .............. *H02P 29/20* (2016.02); *H02P 29/10* (2016.02)

(58) Field of Classification Search
CPC .......... H02P 29/10; H02P 29/20; H02P 21/18; G05B 19/19; B23Q 15/12
See application file for complete search history.

(56) References Cited

U.S. PATENT DOCUMENTS

2017/0277160 A1*    9/2017   Morita ................... G05B 19/29

FOREIGN PATENT DOCUMENTS

JP          61-233814          10/1986
JP           5455737 B          3/2014

OTHER PUBLICATIONS

International Search Report of PCT application No. PCT/JP2022/017632 dated Jun. 28, 2022.

* cited by examiner

*Primary Examiner* — Said Bouziane
(74) *Attorney, Agent, or Firm* — Rimon P.C.

(57) ABSTRACT

Provided is a motor control device capable of suppressing an increase in a time required for settling a position of a mover. Motor control device includes signal processing circuit that controls motor that moves mover. In a case where a change amount of a position deviation per unit time is equal to or less than a predetermined change amount, the position deviation being a difference between a target position of mover and a position of mover detected by position detection device for detecting the position of mover, signal processing circuit controls motor, and a first force for accelerating a speed of mover is generated and a second force for decelerating the speed of mover is generated after the first force is generated.

11 Claims, 3 Drawing Sheets

Figure 2:
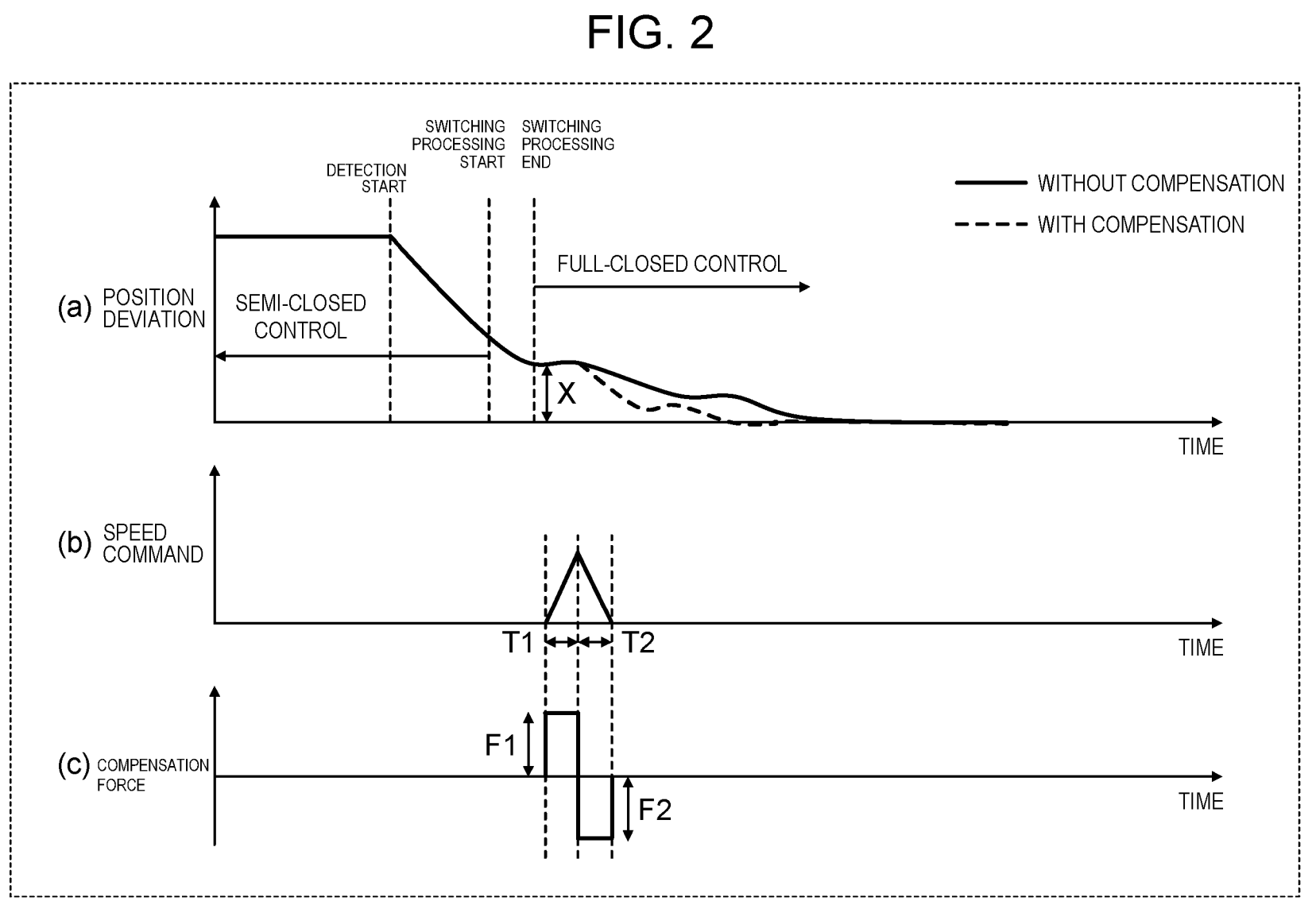

—— WITHOUT COMPENSATION
- - - - WITH COMPENSATION (a) POSITION DEVIATION

DETECTION START

SWITCHING PROCESSING START

SWITCHING PROCESSING END

SEMI-CLOSED CONTROL

FULL-CLOSED CONTROL

X

TIME (b) SPEED COMMAND

T1    T2

TIME (c) COMPENSATION FORCE

F1    F2

TIME

MOTOR CONTROL DEVICE, MOTOR CONTROL SYSTEM, AND MOTOR CONTROL METHOD

TECHNICAL FIELD

The present disclosure relates to a motor control device, a motor control system, a motor control method, and a program.

BACKGROUND ART

In the related art, a motor control device that positions a mover and the like has been known. For example, PTL 1 discloses, as an example of a motor control device, a drive control device including a changeover switch that switches to any one of a semi-closed speed command or a full-closed speed command, and a speed limiter that is provided at a subsequent stage of the changeover switch and limits the speed command to a predetermined magnitude or less to absorb fluctuation of the speed command at the time of control switching.

CITATION LIST

Patent Literature

PTL 1: Japanese Patent No. 5455737

SUMMARY OF THE INVENTION

However, the drive control device disclosed in PTL 1 has a problem that a time required for settling a position of the mover increases.

The present disclosure has been made to solve such a problem, and an object of the present disclosure is to provide a motor control device and the like capable of suppressing an increase in a time required for settling a position of a mover.

A motor control device according to one aspect of the present disclosure includes a signal processing circuit that controls a motor that moves a mover. In a case where a change amount of a position deviation per unit time is equal to or less than a predetermined change amount, the signal processing circuit causes the motor to generate a first force for accelerating a speed of the mover and generate a second force for decelerating the speed of the mover after the first force is generated. The position deviation is a difference between a target position of the mover and a position of the mover detected by a position detection device for detecting the position of the mover.

A motor control system according to another aspect of the present disclosure includes the motor control device, the motor, and the position detection device.

A motor control method according to still another aspect of the present disclosure is a motor control method for controlling a motor that moves a mover including controlling the motor, and a first force for accelerating a speed of the mover is generated and a second force for decelerating the speed of the mover is generated after the first force is generated in a case where a change amount of a position deviation per unit time is equal to or less a predetermined change amount. The position deviation is a difference between a target position of the mover and a position of the mover detected by a position detection device for detecting the position of the mover.

A program according to still another aspect of the present disclosure is a program for causing a computer to execute the above motor control method.

According to the present disclosure, it is possible to provide the motor control device and the like capable of suppressing the increase in the time required for settling the position of the mover.

BRIEF DESCRIPTION OF THE DRAWINGS

FIG. 1 is a block diagram illustrating a functional configuration of a motor control system according to an exemplary embodiment.

FIG. 2 is a diagram for describing an example of an operation of the motor control system in FIG. 1.

DESCRIPTION OF EMBODIMENT

Figure 3:
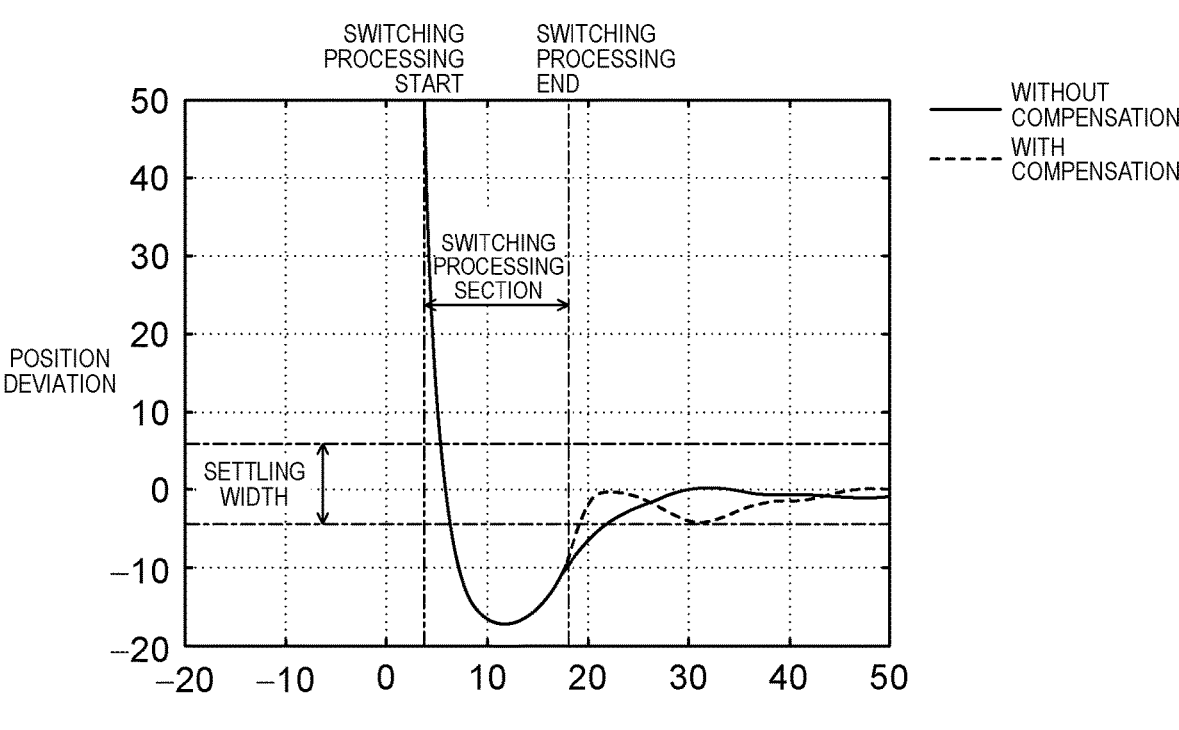
FIG. 3 is a graph representing a time required for settling a position of a mover in a case where there is no first force and no second force and in a case where there are the first force and the second force.

Hereinafter, exemplary embodiments of the present disclosure will be described. Note that all the exemplary embodiments to be described below show one specific example of the present disclosure. Therefore, numerical values, constituent elements, disposition positions and connection modes of the constituent elements, and steps, order of the steps, and the like illustrated in the following exemplary embodiments are merely examples, and are not intended to limit the present disclosure. Thus, among the constituent elements in the following exemplary embodiments, constituent elements that are not described in independent claims indicating the highest concept of the present disclosure are described as optional constituent elements.

In addition, each of the drawings is a schematic diagram, and is not necessarily precisely illustrated. Note that, in each drawing, components substantially identical to components of other drawings are denoted by identical reference signs and repetitive explanations thereof will be omitted or simplified.

EXEMPLARY EMBODIMENT

Figure 1:
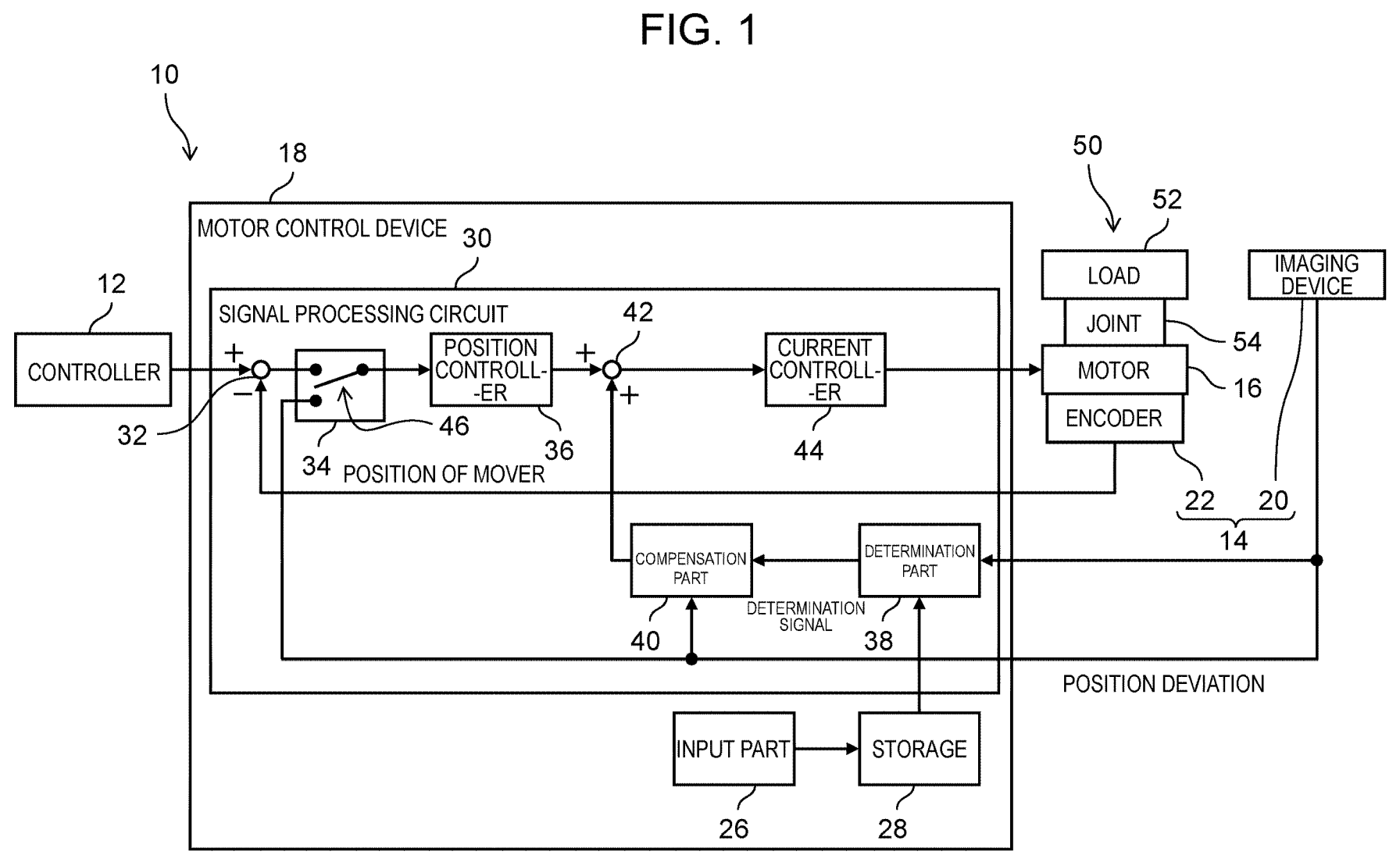

FIG. 1 is a block diagram illustrating a functional configuration of motor control system 10 according to an exemplary embodiment.

As illustrated in FIG. 1, motor control system 10 includes controller 12, position detection device 14, motor 16, and motor control device 18. Motor control system 10 moves mover 50 by controlling motor 16.

In the present exemplary embodiment, mover 50 includes motor 16, load 52 joined to motor 16, joint 54 that joins load 52 to motor 16, and encoder 22 attached to motor 16.

Controller 12 generates a position command indicating a target position of mover 50 and outputs the position command to motor control device 18. For example, the position command indicates a moving distance (moving amount) from an initial position of mover 50 to a target position. For example, controller 12 is a computer, and processing of the controller can be implemented by program processing in the computer.

Position detection device 14 is a device for detecting a position of mover 50. Position detection device 14 includes imaging device 20 and encoder 22.

Imaging device 20 images an image for detecting the position of mover 50. For example, imaging device 20 is installed at a place where the target position of mover 50 can be imaged. For example, in a case where mover 50 is positioned in a range where imaging by imaging device 20 can be performed, imaging device 20 images the target position and mover 50. For example, an image processing unit (not illustrated) analyzes an image imaged by imaging device 20, and calculates a distance between the target position of mover 50 and the detected position of mover 50. The image processing unit outputs the distance as a position deviation that is a difference between the target position of mover 50 and the detected position of mover 50. For example, whenever a predetermined unit time elapses, imaging device 20 images an image, the position deviation is detected by using the image imaged by imaging device 20, and the position deviation is output.

Encoder 22 is a device for detecting the position of mover 50. Encoder 22 outputs the detected position of mover 50. For example, encoder 22 detects the moving distance (moving amount) from the initial position of mover 50, and outputs the moving distance. For example, whenever the unit time elapses, the position of mover 50 is detected by encoder 22, and the position of mover 50 detected by encoder 22 is output.

Motor 16 operates based on a current supplied from motor control device 18, and moves mover 50. For example, motor 16 is a linear motor and moves with load 52, joint 54, and encoder 22.

Motor control device 18 includes input unit 26, storage 28, and signal processing circuit 30.

Input unit 26 receives an input operation of information by a user. For example, input unit 26 receives an input operation of information such as a mass of mover 50, an acceleration of mover 50 when a first force is generated, and an acceleration of mover 50 when a second force is generated. For example, input unit 26 can be implemented by a touch panel, a hardware button, or the like.

Storage 28 stores information input by using input unit 26. For example, storage 28 is implemented by a storage device such as a flash memory, a hard disk drive, or a rewritable optical disk.

Signal processing circuit 30 controls motor 16 that moves mover 50. Although details will be described later, in at least one of a case where a change amount of the position deviation per unit time is equal to a predetermined change amount and a case where the change amount is less than the predetermined change amount, signal processing circuit 30 controls motor 16 such that the first force for accelerating a speed of mover 50 is generated and the second force for decelerating a speed of mover 50 is generated after the first force is generated. Signal processing circuit 30 includes subtractor 32, switching processing part 34, position controller 36, determination part 38, compensation part 40, adder 42, and current controller 44. Note that, the position deviation is a difference between the target position of mover 50 and the position of mover 50 detected by using position detection device 14 for detecting the position of mover 50.

Subtractor 32 calculates a position deviation that is a difference between the target position of mover 50 indicated by the position command output from controller 12 and the position of mover 50 detected by using encoder 22, and outputs the calculated position deviation. For example, subtractor 32 outputs the position deviation whenever the unit time elapses.

Switching processing part 34 includes switch 46 capable of switching between a position for inputting the position deviation output from subtractor 32 to position controller 36 and a position for inputting the position deviation detected by using imaging device 20 to position controller 36.

For example, in a case where mover 50 is not positioned at a position where the position deviation is detectable by using imaging device 20, switching processing part 34 positions switch 46 at the position for inputting the position deviation output from subtractor 32 to position controller 36, and performs so-called semi-closed control. On the other hand, in a case where mover 50 is positioned at the position where the position deviation is detectable by using imaging device 20, switching processing part 34 positions switch 46 at a position for inputting the position deviation detected by using imaging device 20 to position controller 36, and performs so-called full-closed control.

Specifically, for example, switching processing part 34 inputs the position deviation output from subtractor 32 to position controller 36 in a case where mover 50 is not positioned in a range in which imaging by imaging device 20 is enabled, and inputs the position deviation detected by using imaging device 20 to position controller 36 in a case where mover 50 is positioned in a range in which imaging by imaging device 20 is enabled. As described above, switching processing part 34 switches between the semi-closed control and the full-closed control.

Position controller 36 generates and outputs a speed command based on the position deviation. For example, the speed command is a command indicating a speed at which mover 50 is moved. For example, position controller 36 generates and outputs the speed command whenever the unit time elapses.

For example, position controller 36 does not output the speed command in a case where determination part 38 determines that the change amount of the position deviation per unit time is equal to the predetermined change amount or in a case where the change amount is less than the predetermined change amount.

In addition, for example, in a case where mover 50 is not positioned at the position where the position deviation is detectable by using imaging device 20, position controller 36 generates the speed command based on the position deviation detected by using encoder 22. For example, switch 46 is positioned at the position for inputting the position deviation output from subtractor 32 to position controller 36, the position deviation detected by using encoder 22 is input to position controller 36, and position controller 36 generates the speed command based on the position deviation.

In addition, for example, in a case where mover 50 is positioned at the position where the position deviation is detectable by using imaging device 20, position controller 36 generates the speed command based on the position deviation detected by using imaging device 20. For example, in a case where switch 46 is positioned at the position for inputting the position deviation detected by using imaging device 20 to position controller 36, the position deviation detected by using imaging device 20 is input to position controller 36, and position controller 36 generates the speed command based on the position deviation.

Determination part 38 determines at least one of whether or not the change amount of the position deviation per unit time is equal to the predetermined change amount and whether or not the change amount is less than the predetermined change amount. For example, determination part 38 acquires the position deviation whenever the unit time elapses, and determines at least one of whether or not a change amount from the position deviation acquired last time to the position deviation acquired this time is equal to the predetermined change amount and whether or not the change amount is less than the predetermined change amount. For example, determination part 38 determines at least one of whether or not the change amount of the position deviation per unit time detected by using imaging device 20 is equal to the predetermined change amount and whether or not the change amount is less than the predetermined change amount. Determination part 38 outputs a determination signal indicating a determination result.

In a case where determination part 38 determines that the change amount of the position deviation per unit time is equal to the predetermined change amount or that the change amount is less than the predetermined change amount, compensation part 40 generates and outputs the speed command for generating the first force and the second force based on the position deviation. For example, compensation part 40 generates the speed command for generating the first force and the second force based on the position deviation detected by using imaging device 20.

For example, compensation part 40 acquires the position deviation whenever the unit time elapses, and generates and outputs the speed command for generating the first force and the second force based on a magnitude of a latest position deviation acquired before a point in time at which determination part 38 determines that the change amount of the position deviation per unit time is equal to the predetermined change amount or a point in time at which the determination part 38 determines that the change amount is less than the predetermined change amount.

For example, magnitudes of the first force and the magnitude of the second force are set in advance by performance of motor 16 or the like, and compensation part 40 generates the speed command for generating the first force and the second force of predetermined magnitudes. For example, compensation part 40 generates the speed command such that the larger the position deviation, the longer a first time in which the first force is generated and a second time in which the second force is generated.

Adder 42 adds the speed command output from position controller 36 and the speed command output from compensation part 40, and outputs the added speed command.

Current controller 44 supplies a current to motor 16 based on at least one of the speed command output by position controller 36 and the speed command output by compensation part 40.

For example, in a case where determination part 38 determines that the change amount of the position deviation per unit time is equal to the predetermined change amount, and in a case where the determination part 38 determines that the change amount is less than the predetermined change amount, current controller 44 supplies the current to motor 16 based on only the speed command output by compensation part 40 of the speed command output by position controller 36 and the speed command output by compensation part 40.

For example, in a case where determination part 38 determines that the change amount of the position deviation per unit time is equal to the predetermined change amount, and in a case where the determination part 38 determines that the change amount is less than the predetermined change amount, since position controller 36 does not output the speed command, adder 42 outputs the speed command equal to the speed command output by compensation part 40. As a result, current controller 44 can supply the current to motor 16 based on only the speed command output by compensation part 40 of the speed command output by position controller 36 and the speed command output by compensation part 40.

FIG. 2 is a diagram for describing an example of an operation of motor control system 10 in FIG. 1.

As illustrated in part (a) of FIG. 2, for example, when mover 50 is positioned at the position where the position deviation is detectable by using imaging device 20, the detection of the position deviation is started by using imaging device 20. Note that, in part (a) of FIG. 2, the case of without compensation (indicated by a solid line) indicates a case where the first force and the second force are not generated, and the case of with compensation (indicated by a broken line) indicates a case where the first force and the second force are generated.

After the detection of the position deviation is started by using imaging device 20, in a case where the position deviation detected by using imaging device 20 is less than a predetermined position deviation, the switching processing from the semi-closed control to the full-closed control is started. After the switching processing from the semi-closed control to the full-closed control is ended, the full-closed control is started.

In at least one of a case where the change amount of the position deviation per unit time that is the difference between the target position of mover 50 and the position of mover 50 detected by using position detection device 14 is equal to the predetermined change amount and a case where the change amount is less than the predetermined change amount, signal processing circuit 30 controls motor 16 such that the first force is generated and the second force is generated after the first force is generated.

For example, as illustrated in part (b) of FIG. 2, compensation part 40 generates and outputs the speed command based on the position deviation detected by using imaging device 20. In addition, for example, as illustrated in part (c) of FIG. 2, current controller 44 supplies the current to motor 16 based on the speed command output by compensation part 40, and generates the first force and the second force as compensation forces. As described above, signal processing circuit 30 controls motor 16 such that the first force is generated and the second force is generated after the first force is generated.

For example, signal processing circuit 30 determines the first time in which the first force is generated and the second time in which the second force is generated based on the position deviation. For example, signal processing circuit 30 determines the first time and the second time such that the larger the position deviation, the longer the first time in which the first force is generated and the second time in which the second force is generated.

For example, assuming that the position deviation is X, the magnitude of the first force is F1, the magnitude of the second force is F2, the mass of mover 50 is M, the first time is T1, and the second time is T2, signal processing circuit 30 determines the first time to satisfy (Equation 1) below, and determines the second time to satisfy (Equation 2) below. Note that, as described above, for example, the magnitude of the first force and the magnitude of the second force are determined in advance.

[Math. 1]

$$T1 = \sqrt{\frac{MX}{F1}}$$ (Equation 1)

[Math. 2]

-continued $$T2 = \sqrt{\frac{MX}{F2}} \qquad \text{(Equation 2)}$$

For example, signal processing circuit 30 controls motor 16 such that the first force and the second force are continuously generated. That is, signal processing circuit 30 controls motor 16 such that the second force is generated immediately after the first time elapses.

Since the position deviation can be reduced more quickly (see the broken line in part (a) of FIG. 2) and mover 50 can be settled more quickly by generating the first force and the second force in this manner, an increase in a time required for settling the position of mover 50 can be suppressed.

FIG. 3 is a graph representing the time required for settling the position of mover 50 in a case where there is no first force and no second force and in a case where there are the first force and the second force. The time required for settling the position of mover 50 is the time required for settling mover 50 within a predetermined settling width. Note that, in FIG. 3, the case of without compensation (indicated by the solid line) indicates a case where the first force and the second force are not generated, and the case of with compensation (indicated by the broken line) indicates a case where the first force and the second force are generated.

As illustrated in FIG. 3, it can be seen that the time required for settling the position of mover 50 in the case of with compensation is less than the time required for settling the position of mover 50 in the case of without compensation. Specifically, the time required for settling the position of mover 50 after the end of the switching processing from the semi-closed control to the full-closed control is about 10% less in the case of with compensation than in the case of without compensation.

As described above, since mover 50 can be settled more quickly by generating the first force and the second force, the increase in the time required for settling the position of mover 50 can be suppressed.

Motor control device 18 according to the exemplary embodiment has been described above.

Motor control device 18 according to the exemplary embodiment includes signal processing circuit 30 that controls motor 16 that moves mover 50, and signal processing circuit 30 controls motor 16 such that the first force for accelerating the speed of mover 50 is generated and the second force for decelerating the speed of mover 50 is generated after the first force is generated in at least one of a case where the change amount of the position deviation per unit time that is the difference between the target position of mover 50 and the position of mover 50 detected by using position detection device 14 for detecting the position of mover 50 is equal to the predetermined change amount and a case where the change amount is less than the predetermined change amount. Note that, the position deviation is a difference between the target position of mover 50 and the position of mover 50 detected by using position detection device 14 for detecting the position of mover 50.

According to this, when mover 50 approaches the target position and the change amount of the position deviation per unit time decreases, the first force can be generated to bring mover 50 closer to the target position more quickly, and the second force can be generated to prevent mover 50 from exceeding the target position and separating from the target position. Therefore, since mover 50 can be settled near the target position more quickly, the increase in the time required for settling the position of mover 50 can be suppressed.

In addition, in motor control device 18 according to the exemplary embodiment, signal processing circuit 30 may determine the first time in which the first force is generated and the second time in which the second force is generated based on the position deviation.

According to this, when the position deviation is large, the first force is generated for a longer time, and thus, mover 50 can be brought closer to the target position more quickly. In addition, the second force is generated for a longer time, and thus, mover 50 can be further prevented from exceeding the target position and separating from the target position. Therefore, since mover 50 can be settled near the target position more quickly, the increase in the time required for settling the position of mover 50 can be further suppressed.

In addition, in motor control device 18 according to the exemplary embodiment, assuming that the position deviation is X, the magnitude of the first force is F1, the magnitude of the second force is F2, the mass of mover 50 is M, the first time is T1, and the second time is T2, signal processing circuit 30 may determine the first time to satisfy the following (Equation 1) and may determine the second time to satisfy the following (Equation 2).

[Math. 3]

$$T1 = \sqrt{\frac{MX}{F1}} \qquad \text{(Equation 1)}$$

[Math. 4]

$$T2 = \sqrt{\frac{MX}{F2}} \qquad \text{(Equation 2)}$$

According to this, since the first time and the second time can be easily calculated, the increase in the time required for settling the position of mover 50 can be easily suppressed.

In addition, in motor control device 18 according to the exemplary embodiment, signal processing circuit 30 may control motor 16 such that the first force and the second force are continuously generated.

According to this, the increase in the time required for settling the position of mover 50 can be suppressed while vibration of mover 50 is suppressed.

In addition, in motor control device 18 according to the exemplary embodiment, signal processing circuit 30 may include position controller 36, determination part 38, compensation part 40, and current controller 44. Position controller 36 generates and outputs the speed command based on the position deviation. Determination part 38 determines at least one of whether or not the change amount of the position deviation per unit time is equal to the predetermined change amount and whether or not the change amount is less than the predetermined change amount. In a case where determination part 38 determines that the change amount is equal to the predetermined change amount and in a case where the determination part 38 determines that the change amount is less than the predetermined change amount, compensation part 40 generates and outputs the speed command for generating the first force and the second force based on the position deviation. Current controller 44 may supply the current to motor 16 based on at least one of the speed command output by position controller 36 and the speed command output by compensation part 40. In a case where determination part 38 determines that the change amount is equal to the predetermined change amount and in a case where the determination part 38 determines that the change amount is less than the predetermined change amount, current controller 44 may supply the current to motor 16 based on only the speed command output by compensation part 40 of the speed command output by position controller 36 and the speed command output by compensation part 40.

According to this, since the speed of mover 50 can be more reliably accelerated based on the first force and the speed of mover 50 can be more reliably decelerated based on the second force, the increase in the time required for settling the position of mover 50 can be more reliably suppressed.

In addition, in motor control device 18 according to the exemplary embodiment, position controller 36 may not output the speed command in a case where determination part 38 determines that the change amount of the position deviation per unit time is equal to the predetermined change amount and in a case where the determination part 38 determines that the change amount is less than the predetermined change amount.

According to this, since the speed of mover 50 can be more reliably accelerated based on the first force and the speed of mover 50 can be more reliably decelerated based on the second force, the increase in the time required for settling the position of mover 50 can be more reliably suppressed.

In addition, in motor control device 18 according to the exemplary embodiment, position detection device 14 may include imaging device 20, and compensation part 40 may generate the speed command for generating the first force and the second force based on the position deviation detected by using imaging device 20.

According to this, since the position deviation can be more accurately calculated based on the image imaged by imaging device 20, the position of mover 50 can be more accurately settled.

In addition, in motor control device 18 according to the exemplary embodiment, position detection device 14 may further include encoder 22. Position controller 36 may generate the speed command based on the position deviation detected by using encoder 22 in a case where mover 50 is not positioned at the position where the position deviation is detectable by using imaging device 20, and may generate the speed command based on the position deviation detected by using imaging device 20 in a case where mover 50 is positioned at the position where the position deviation is detectable by using imaging device 20.

According to this, the speed command can be easily generated based on the position deviation detected by using encoder 22 in a case where mover 50 is not positioned at the position where the position deviation is detectable by using imaging device 20, and the speed command can be easily generated based on the position deviation detected by using imaging device 20 in a case where mover 50 is positioned at the position where the position deviation is detectable by using imaging device 20. Therefore, the increase in the time required for settling the position of mover 50 can be suppressed.

(Other Exemplary Embodiments and the Like)

As described above, the exemplary embodiment has been described as an illustration of the techniques disclosed in the present application. However, the technique according to the present disclosure is not limited thereto, and can also be applied to exemplary embodiments or modifications in which changes, replacements, additions, omissions, and the like are made as appropriate without departing from the concept of the present disclosure.

In the above-described exemplary embodiment, although it has been described that signal processing circuit 30 determines the first time in which the first force is generated and the second time in which the second force is generated based on the position deviation, the present disclosure is not limited thereto. For example, the signal processing circuit may fix the first time and the second time, and may determine the magnitude of the first force and the magnitude of the second force based on the position deviation. For example, the signal processing circuit may determine the magnitude of the first force and the magnitude of the second force such that the larger the position deviation, the longer the first force and the second force.

In addition, in the above-described exemplary embodiment, although it has been described that signal processing circuit 30 controls motor 16 such that the first force and the second force are continuously generated, the present disclosure is not limited thereto. For example, the signal processing circuit may control the motor such that the second force is generated at a time interval after the first force is generated.

In addition, in the above-described exemplary embodiment, it has been described that position controller 36 does not output the speed command in a case where determination part 38 determines that the change amount of the position deviation per unit time is equal to the predetermined change amount and in a case where the determination part 38 determines that the change amount is less than the predetermined change amount, the present disclosure is not limited thereto. For example, the position controller may output the speed command in a case where the determination part determines that the change amount of the position deviation per unit time is equal to the predetermined change amount and in a case where the determination part determines that the change amount is less than the predetermined change amount. In this case, for example, in a case where the determination part determines that the change amount of the position deviation per unit time is equal to the predetermined change amount, or in a case where the determination part determines that the change amount is less than the predetermined change amount, the adder may set a degree of contribution of the speed command output from the position controller to zero, and may output only the speed command output from the compensation part to the current controller.

In addition, in the above-described exemplary embodiment, although it has been described that compensation part 40 generates the speed command for generating the first force and the second force based on the position deviation detected by using imaging device 20, the present disclosure is not limited thereto. For example, the compensation part may generate the speed command for generating the first force and the second force based on the position deviation detected by using the encoder.

In addition, in the above-described exemplary embodiment, although it has been described that position detection device 14 includes imaging device 20, the present disclosure is not limited thereto. For example, the position detection device may not include the imaging device. In this case, for example, the switching processing part may not be provided, and the position command output from the subtractor may be constantly input to the position controller.

In addition, in the above-described exemplary embodiment, although it has been described that motor 16 is a linear motor and moves together with load 52 or the like the present disclosure is not limited thereto. For example, the motor may be a rotary motor or may not move with the load or the like. In this case, the mover does not include the motor.

In addition, in the above-described exemplary embodiment, although it has been described that imaging device 20 is installed at a place where the target position of mover 50 can be imaged, the present disclosure is not limited thereto. For example, the imaging device may be attached to the load. In this case, the mover includes the imaging device. In addition, in this case, in a case where the target position of the mover is positioned in a range where imaging by the imaging device is enabled, the imaging device images the target position of the mover, and the image processing unit analyzes the image imaged by the imaging device and calculates the distance between the target position of the mover and the position of the mover.

In addition, general or specific aspects of the present disclosure may be implemented by a system, a device, an apparatus, a method, an integrated circuit, a computer program, or a computer-readable recording medium such as a CD-ROM. In addition, the aspects may be implemented with any combination of the system, the device, the apparatus, the method, the integrated circuit, the computer program, and the recording medium.

For example, the present disclosure may be implemented as the motor control system of the above-described exemplary embodiment. In addition, the present disclosure may be implemented as the motor control device. In addition, the present disclosure may be implemented as the motor control method. In addition, the present disclosure may be implemented as a program for causing a computer to execute the motor control method, or may be implemented as a computer-readable non-transitory recording medium in which such a program is recorded.

INDUSTRIAL APPLICABILITY

The motor control device and the like according to the present disclosure can be used for the control device and the like that move the mover by using the motor.

REFERENCE MARKS IN THE DRAWINGS

10: motor control system
12: controller
14: position detection device
16: motor
18: notification device
20: imaging device
22: first input device
26: input unit
28: storage
30: signal processing circuit
32: subtractor
34: switching processing part
36: position controller
38: determination part
40: compensation part
42: adder
44: current controller
46: switch

The invention claimed is:
1. A motor control device comprising
a signal processing circuit that controls a motor that moves a mover, the signal processing circuit including a current controller that supplies a current to the motor to control a force generated by the motor, wherein, in a case where a change amount of a position deviation per unit time is equal to or less than a predetermined change amount, the signal processing circuit causes the motor to generate a first force for accelerating a speed of the mover for a first time period and generate a second force for decelerating the speed of the mover after the first time period elapses, the position deviation being a difference between a target position of the mover and a position of the mover detected by a position detection device for detecting the position of the mover, the signal processing circuit includes:

a position controller that generates and outputs a first speed command based on the position deviation, a determination part that determines at least one of whether or not the change amount is equal to the predetermined change amount and whether or not the change amount is less than the predetermined change amount, and a compensation part that generates and outputs a second speed command for generating the first force and the second force based on the position deviation in a case where the determination part determines that the change amount is equal to the predetermined change amount and in a case where the determination part determines that the change amount is less than the predetermined change amount, the current controller supplies the current to the motor based on at least one of the first speed command and the second speed command output, and the current controller supplies the current to the motor based on only the second speed command in a case where the determination part determines that the change amount is equal to the predetermined change amount and in a case where the determination part determines that the change amount is less than the predetermined change amount.

2. The motor control device according to claim 1, wherein the signal processing circuit determines, based on the position deviation, the first time period in which the first force is generated and a second time period in which the second force is generated.

3. The motor control device according to claim 2, wherein the signal processing circuit determines the first time period, and the second time period, as follows:

[Math. 1]

$$T1 = \sqrt{\frac{MX}{F1}}, \text{ and} \qquad \text{(Equation 1)}$$

[Math. 2]

$$T2 = \sqrt{\frac{MX}{F2}}, \qquad \text{(Equation 2)}$$

where X is the position deviation, F1 is a magnitude of the first force, F2 is a magnitude of the second force, M is a mass of the mover, T1 is the first time period, and T2 is the second time period.

4. The motor control device according to claim 1, wherein the signal processing circuit controls the motor such that the second force is generated continuously after the first time period.

5. The motor control device according to claim 1, wherein the position controller does not output the speed command in a case where the determination part determines that the change amount is equal to the predetermined change amount and in a case where the determination part determines that the change amount is less than the predetermined change amount.

6. The motor control device according to claim 1, wherein the position detection device includes an imaging device, and the compensation part generates the speed command for generating the first force and the second force based on the position deviation detected by using the imaging device.

7. The motor control device according to claim 6, wherein the position detection device further includes an encoder, and the position controller generates the speed command based on the position deviation detected by using the encoder in a case where the mover is not positioned at a position where the position deviation is detectable by using the imaging device, and generates the speed command based on the position deviation detected by using the imaging device in a case where the mover is positioned at the position where the position deviation is detectable by using the imaging device.

8. A motor control system comprising:

the motor control device according to claim 1;

the motor; and the position detection device.

9. The motor control system according to claim 8, further comprising a controller that generates a position command indicating the target position and outputs the position command to the motor control device.

10. The motor control system according to claim 8, wherein the motor is a linear motor.

11. A motor control method for controlling a motor that moves a mover, comprising:

detecting a position of the mover by using a position detection device;

obtaining a change amount of a position deviation per unit time, the position deviation being a difference between a target position of the mover and the position of the mover detected by the position detection device;

causing the motor to generate a first force for accelerating a speed of the mover for a first time period, upon determining that the change amount of the position deviation per unit time is equal to or less a predetermined change amount;

causing the motor to generate a second force for decelerating the speed of the mover after the first time period elapsed, wherein the method further comprises:

generating and outputting a first speed command based on the position deviation;

determining at least one of whether or not the change amount is equal to the predetermined change amount and whether or not the change amount is less than the predetermined change amount;

generating and outputting a second speed command for generating the first force and the second force based on the position deviation in a case where it is determined that the change amount is equal to the predetermined change amount and in a case where it is determined that the change amount is less than the predetermined change amount;

supplying current to the motor based on at least one of the first speed command and the second speed command; and supplying the current to the motor based on only the second speed command in a case where it is determined that the change amount is equal to the predetermined change amount and in a case where it is determined that the change amount is less than the predetermined change amount.

* * * * *